Sept. 27, 1955    P. R. MARVIN    2,719,200
THERMALLY ACTUATED SWITCH
Filed Nov. 30, 1950    2 Sheets-Sheet 1
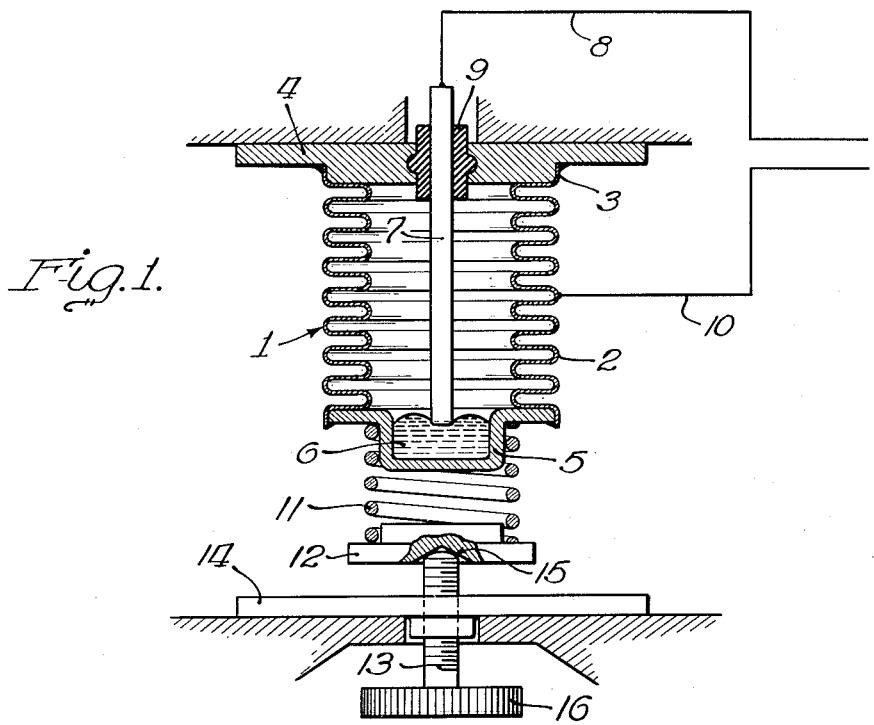
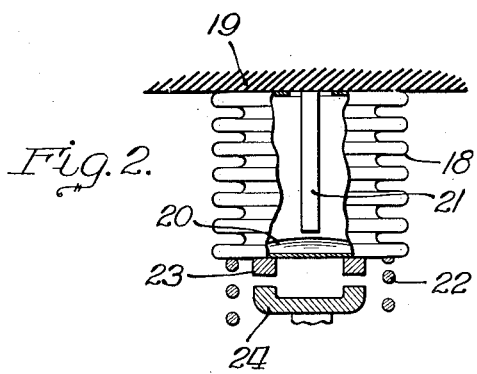
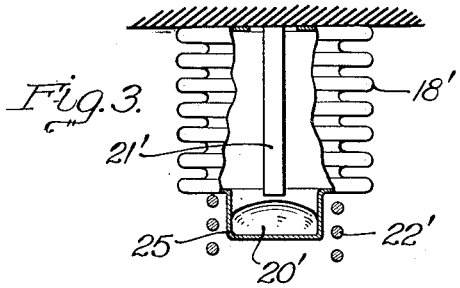
INVENTOR.
Philip R. Marvin
BY
Attys.

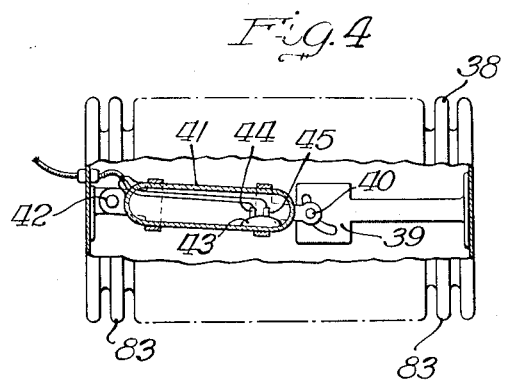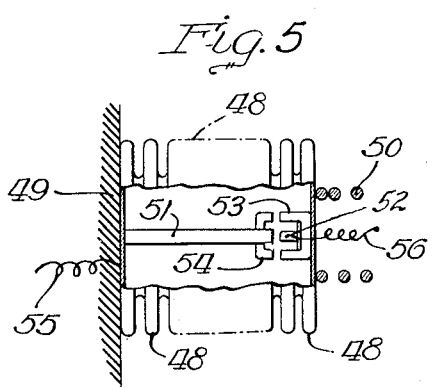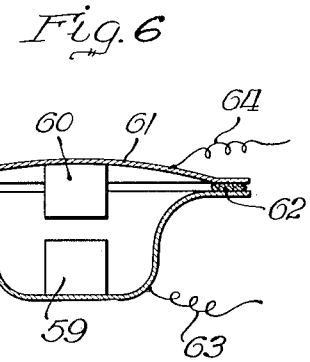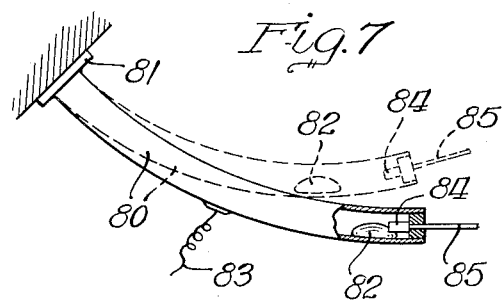

United States Patent Office 2,719,200
Patented Sept. 27, 1955

2,719,200

THERMALLY ACTUATED SWITCH

Philip R. Marvin, Bloomington, Ind., assignor to Milwaukee Gas Specialty Company, Milwaukee, Wis., a corporation of Wisconsin Application November 30, 1950, Serial No. 198,460

6 Claims. (Cl. 200—140)

This invention relates, in general, to electric switches, and has particular relation to a thermally actuated switch.

Electric switches, the operation of which is responsive to temperature changes, are known in the art as thermostats and are used with controls for regulating automatically the temperature produced by heating apparatus and for controlling refrigeration, conditioning, and other devices.

Thermoelectric safety shutoff devices for maintaining, for example, flow of fuel to a burner as long as a thermoelectric generator is heated by the flame of a pilot burner and for shutting off the flow of fuel to the burner upon extinguishment of the pilot burner flame are known in the art. Due to the inability of the minute thermoelectric current that can be generated by the heat of a pilot burner flame on a thermoelectric generator to open the shutoff valve, it has been previously proposed to employ, for example, a diaphragm valve which operates in conjunction with the thermoelectric generator and its electromagnet to establish a flow of fuel to the burner upon energization of the electromagnet by the heat of the pilot burner on the thermoelectric generator.

These latter devices have been automatic or self-operating, and may employ thermally actuated switch means connected into the thermoelectric circuit which includes the thermoelectric generator and its electromagnet.

While the particular devices which I shall describe hereinafter in connection with the drawings are adapted for use with thermoelectric safety shutoff and diaphragm valve controls as above set forth, it is to be understood that the thermally actuated switch of the present invention may be used with controls for other devices, or for making, breaking or changing the connections in one or more electric circuits for heaters, refrigeration devices, or other devices as suitable or desired.

One of the main objects of the present invention is to provide an improved thermostat which will overcome shortcomings of prior bimetallic thermostats, and more particularly, an improved thermostat which is more sensitive than the usual existing bimetallic type thermostat and may be relatively small and compact and of relatively low mass and high action.

Another object of the invention is to provide a thermostat in which the cooperating contacts are disposed within a sealed and expansible and contractible container containing a volatile fluid which not only acts to expand and contract the container to separate and engage the contacts upon temperature chagnes, but which volatile fluid, by disposition of the contacts therein, also acts to keep the contacts clean and to dissipate any arcing at the contacts.

Another object of the invention is to provide in an improved thermostat of the character disclosed means for adjusting the resistance to expansion of the container, and thereby the temperature at which the contacts are separated.

Another object of the invention is to provide in an improved thermostat of the character disclosed magnetic means for imparting snap action to the contacts.

Another object of the invention is to embody the new advantageous features of the present invention in a thermally actuated switch in which each of the cooperating contacts is of solid form; also in a thermally actuated switch in which one of the contact means is in the form of a mercury pool and the other in the form of a contact for engagement with and separation from the mercury pool.

Further objects and advantages and numerous adaptations of the invention will appear from the following detailed description, taken in connection with the accompanying drawings.

In the drawings:

Figure 1 is a sectional view taken axially through one form of thermally actuated switch embodying the present invention;

Figures 2, 3, 4, 5, and 6 are more or less diagrammatic axial sectional views showing further embodiments of the invention; and Figure 7 is a more or less schematic elevational view of another embodiment of the invention.

Referring first to Figure 1, in the embodiment of the invention therein illustrated, the expansible and contractible container is in the form of a flexible bellows or sylphon 1 having a flexible and corrugated side wall 2 and fixedly secured at one end at 3 to a base 4 or other suitable fixed support.

The opposite end of the bellows 1 has a well or cuplike structure 5 of reduced volume which contains internally of the bellows 1 a pool of mercury indicated at 6. The pool of mercury 6 constitutes one of the contact means of the thermally actuated switch. The other contact means is in the form of an electrode 7 which may, for example, be carried by the support 4. The inner end of the electrode 7 extends inwardly into the interior of the bellows 1, and is disposed for contact or engagement with the mercury pool 6 and for separation or disengagement therefrom, as will presently appear.

The outer end of the electrode 7 may, for example, extend outwardly to position externally of the bellows 1 for connection, as shown diagrammatically in the drawing, to a lead conductor 8 of an electric circuit which the thermostat is adapted to open and close. The bellows 1 is sealed or closed tight, and to this end the opening through which the electrode 7 extends may be sealed by a suitable insulating seal 9 which may, for example, be a glass seal. The conductor 10 forming the other side of the electric circuit, which is opened and closed by the thermostat, may, for example, be connected as shown diagrammatically in the drawing to the wall of the bellows 1. In such case, the wall of the bellows 1 is formed of metal or other suitable conducting material, and the insulating seal 9 insulates the thermostat against completion of the electric circuit except through engagement or contact of the electrode 7 with the mercury pool 6.

In the illustrated embodiment of the invention, the well or cup-like structure 5 is shown as a separate structure suitably secured and sealed to the lower end of the bellows 1. It is to be understood, however, that where there is such a well or cup-like structure it may be formed as an integral part of the wall of the bellows at the lower end thereof.

The interior of the bellows 1 is filled with a volatile fluid which is adapted to expand and contract with accompanying expansion and contraction of the bellows 1 upon changes in ambient temperature at the position at which the bellows 1 is disposed. The range of operation of the thermostat should preferably be above such range that barometric pressure fluctuations will affect the same. For example, if suitable high pressure fills are used, the pressure per square inch in the ambient temperature range will preferably be such that barometric changes will have no effect, or very little effect, on the device.

As illustrative examples, butane—which is a colorless, gaseous compound ($C_4H_{10}$) of the aliphatic hydrocarbon or marsh-gas series—at 70° F. will exert a pressure of approximately 31 pounds. Iso-butane at 70° F. will exert a pressure of approximately 45 pounds. Sulphur dioxide ($SO_2$) at 70° F. will exert a pressure of approximately 50 pounds. Methyl chloride ($CH_3Cl$) at 70° F. will exert a pressure of approximately 72 pounds. "F–12" or Freon ($CCl_2F_2$) at 70° F. will exert a pressure of approximately 85 pounds. Propane ($C_3H_8$) at 70° F. will exert a pressure of approximately 120 pounds.

All of the foregoing volatile fluids are common fills for expansible and contractible bellows without increasing pressure for temperature characteristics. Accordingly, it is apparent that, especially with the high-pressure fills, ambient barometric pressures are of negligible effect.

The present invention disposes at least the inner end of the contact 7 and also the cooperating contact means shown in this embodiment of the invention in the form of the mercury pool 6 within the interior of the flexible bellows 1, and thereby within the atmosphere of the volatile fluid within the bellows. In this way the volatile fluid functions not only to produce expansion and contraction of the bellows 1, but also to dissipate any arcing at the contacts. Moreover, the contacts are thereby at all times bathed in the volatile fluid and kept clean. These are highly important aspects of the present invention.

It is to be understood that the embodiments of the invention using a mercury pool as one of the contacts will be used in vertical or upright position, with the mercury pool disposed at the bottom of the interior of the bellows as shown in the drawings. With the reduced diameter well or cup-like structure 5 at the bottom of the bellows, the mercury will drain into such well or cup-like structure, and the amount or volume of mercury required for satisfactory operation may be reduced.

An adjustment spring 11 is interposed between the bottom of the bellows 1 or the outwardly extending flange or wall of the well or cup-shaped structure 5 and a seating or abutment disc 12. The spring 11 acts at one end against the adjacent lower portion of the bellows 1, and, at its opposite end, against the plate or disc 12. For the purpose of keeping the spring 11 centered, its upper end is shown surrounding the reduced well or cup of the cup-shaped structure 5, and its lower end is shown surrounding a boss on the plate 12.

The spring 11 imparts yielding resistance to the expansion of the bellows 1. For the purpose of adjusting the action of the spring 11 to adjust the temperature at which the contact 7 separates from the mercury pool 6 to open the circuit 8, 10, an adjustment screw 13 is provided. The screw 13 is screwed through a fixed member or support 14, with its inner end engaging the bottom of the disc or plate 12, for example, in a notch 15 therein. The outer end of the screw 13 has a knob or finger piece 16 for turning the screw to adjust the thermostat for different temperatures as suitable or desired.

In the use of the thermally actuated switch shown in Figure 1, it is positioned in the room or other space, or where it will be otherwise subject to the temperature which it is desired to maintain.

Where, for example, the device is used as a thermostat for regulating automatically the temperature produced by heating apparatus to maintain the temperature of a room or space at a definite degree, it is positioned in such room or space where it will be subject to the ambient temperature therein. When the ambient temperature rises above the temperature for which the thermostat is set, the volatile fluid within the bellows 1 expands, with the result that the bellows expands endwise, causing the mercury pool 6 to be forced or moved downwardly to such a degree that it compresses the spring 11 and causes the mercury pool 6 to move out of contact with the contact or electrode 7. This opens the circuit shown diagrammatically and fragmentarily at 8, 10, which results in shutting off the heating action of a heater (not shown), for example, by shutting off the flow of fuel to the burner of the heater.

When the ambient temperature drops below the temperature for which the thermostat is set, the volatile fluid within the bellows 1 contracts with accompanying endwise contraction of the bellows, for example, under the action of the spring 11. This causes the mercury pool 6 to move upwardly into contact with the contact or electrode 7 which closes the circuit 8, 10 and starts the heating action, for example, by establishing a flow of fuel to the burner. Within the broader aspects of the invention, the corrugated flexible side wall of the bellows 1 may have inherent springiness or resiliency to contract and close the contacts without additional spring means.

For the purpose of adjusting the temperature for which the thermostat is set, the screw 13 is screwed inwardly or outwardly through the member 14, depending upon the adjustment desired. When the screw 13 is screwed inwardly, it increases the resistance of the spring 11 to expansion of the bellows. This sets the device for separation of the contacts at a higher temperature. Conversely, when the screw 13 is screwed outwardly, it reduces the resistance of the spring 11 to expansion of the bellows, and the contacts will then separate at a lower temperature.

As previously set forth, the volatile fluid within the bellows 1 functions not only to produce expansion and contraction of the bellows, but also at all times to bathe the contacts 6 and 7 and dissipate any arcing at the contacts.

It is contemplated within the broader aspects of the present invention to leave the spring 11 stationary and move the bellows, or a wall thereof, or one of the contacts to obtain the desired adjustment of the temperature for which the device is set.

In the case of the adjustment described, the knob 16 may have temperature markings thereon for register with a pointer or index marking, for example, on the member 14, to indicate the temperature for which the device is set.

The structures selected for illustration provide compact devices with minimum amounts of material and the devices will, therefore, be sensitive and have a low thermostatic lag.

Where the device is used with a thermoelectric safety shutoff and diaphragm valve control, the contacts may be connected into the thermoelectric circuit to open and close such circuit, for example, as shown in Guido Wunsch and Josef Schuppert Patent No. 2,291,567, patented July 18, 1942.

In the embodiment of the invention shown more or less diagrammatically in Figure 2, the expansible and contractible bellows 18 is fixedly secured at one end to an insulating head 19. The bellows 18, which is sealed, is filled with a volatile fluid as in the preceding embodiment of the invention, and holds within the bottom thereof a pool of mercury 20 which moves into and out of contact with the electrode or contact 21, as previously described. As before, the contacts are disposed within the atmosphere of the volatile fluid which functions to produce expansion and contraction of the bellows 18.

In Figure 2, an adjustment spring is shown at 22. An externally disposed magnet 23 is secured, for example, to the bottom of the bellows 18 for movement by expansion and contraction of the bellows into and out of cooperation with an armature 24 which is preferably fixedly supported, but may be adjustably supported for adjustment purposes. The magnet 23 and armature 24 impart a snap action in the opening and closing of the contacts.

The embodiment of the invention shown in Figure 3 is similar to the embodiment shown in Figure 2, except that the magnet and armature are omitted and the bottom of the bellows has a reduced diameter cup or well 25 containing the mercury pool 20', which moves into and out of contact with the contact 21'. The bellows is indicated at 18' and the adjustment spring is indicated fragmentarily at 22'.

In Figure 4, the bellows 38—which is sealed and filled with the volatile fluid, as before—carries a cam 39 having, for example, a slot which cooperates with a pin 40 on a mercury switch tube 41 pivoted at 42 on the opposite end of the bellows. The mercury switch tube contains a globule of mercury 43 which, by rocking of the tube, moves into and out of position to connect and disconnect contacts 44 and 45. Expansion and contraction of the bellows rocks the tube 41 to open and close the switch.

In Figure 5, the bellows 48 is fixedly secured at one end to an insulating head 49, and an adjustment spring 50 cooperates with the opposite movable end of the bellows. The cooperating contacts are indicated at 51 and 52 in this form of the invention. A permanent magnet 53 is secured to the movable end of the bellows 48 and is disposed internally of the bellows and within the volatile fluid therein. A cooperating armature 54 carried, for example, by the contact or electrode 51 is also disposed internally of the bellows and within the atmosphere of the volatile fluid therein. The magnet 53 and armature 54 impart a snap action in the opening and closing of the contacts. The circuit conductors shown fragmentarily at 55 and 56 are connected to the contacts 51 and 52 respectively, the connection of conductor 55 to its contact 51 being, for example, through the wall of the bellows.

Instead of using a bellows as the expansible and contractible container, the expansible and contractible container may, as shown in Figure 6, comprise a cup 58 formed, for example, of drawn metal and carrying internally thereof a contact 59. The contact 59 cooperates with a contact 60 which is carried by a snap action diaphragm 61, and moves into and out of contact with the contact 59. The diaphragm 61 is secured to the cup 58, for example, by pasting as at 62. The cup 58 is filled with the desired volatile fluid, and if desired in this structure a plunger (not shown) may act upon the diaphragm 61 to cause the contact 60 to snap into contact with the contact 59 upon contraction of the volatile fluid within the cup 58. The circuit conductors shown fragmentarily at 63 and 64 are connected to contacts 59 and 60, for example, through the wall of the cup 58 and through the wall of the diaphragm 61 respectively.

In Figure 7, one end of a closed and sealed tube 80 is secured to a fixed support 81. The tube 80 contains a mercury globule 82 connected in circuit with one circuit conductor 83, for example, through the wall of the tube 80. A contact 84 connected to the other circuit conductor 85 extends into the opposite end of the tube 80 which is filled with the desired volatile fluid and normally assumes the curved position shown in dotted lines, with mercury contact 82 separated from the contact 84. Upon expansion of the volatile fluid, the tube 80 straightens at least partially to its full line position, and the mercury contact 82 moves into contact with the contact 84 to close the circuit. This structure may, of course, be arranged to open the circuit upon expansion of the volatile fluid, and to close the circuit upon contraction of the volatile fluid.

In Figure 1 the lower end of the contact 7 may be pointed to increase the sensitivity of the device so that only a few thousandths of an inch will effect, make and break contact with the mercury pool. For extremely sensitive differentials, the lower end of the contact 7 may be of a type which is not wetted by the mercury pool 6 with which it cooperates. This may not be desired for automatic control operation, but may be employed if and where it may be suitable or desired. The features mentioned in this paragraph may also be employed with the embodiments of the invention shown in Figures 2 and 3.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. A temperature responsive circuit controlling device for low power circuits having high sensitivity and low differential comprising, in combination, an hermetically sealed expansible and contractible enclosure, a pair of cooperating contacts within and relatively movable with expansion and contraction of said enclosure, one of said contacts being a mercury pool and the other being of a metal not wettable by said mercury pool, whereby said contacts move into contact with and separate from each other with a quick-make, quick-break action upon expansion and contraction of said enclosure in response to small changes in temperature, and a volatile fluid fill disposed within said enclosure, said contacts being at all times directly exposed to said fill, and said fill being of a character which under the operating temperature range of the device prevents the formation of said contacts of films deleteriously affecting the flow of small electric energy between said contacts.

2. A temperature responsive circuit controlling device for low power circuits comprising, in combination, an hermetically sealed expansible and contractible enclosure, a pair of cooperating contacts within and relatively movable with expansion and contraction of said enclosure, one of said contacts being a mercury pool and the other being of a metal not wettable by said mercury pool, whereby said contacts move into contact with and separate from each other with a quick-make, quick-break action upon expansion and contraction of said enclosure in response to small changes in temperature, a volatile fluid fill disposed within said enclosure, said contacts being at all times directly exposed to said fill, and said fill being of a character which under the operating temperature range of the device prevents the formation on said contacts of films deleteriously affecting the flow of small electric energy between said contacts, and means operatively associated with said contacts for imparting snap-action to the movement thereof.

3. A temperature responsive circuit controlling device for low power circuits comprising, in combination, an hermetically sealed expansible and contractible enclosure, a pair of cooperating contacts within and relatively movable with expansion and contraction of said enclosure, one of said contacts being a mercury pool and the other being of a metal not wettable by said mercury pool, whereby said contacts move into contact with and separate from each other with a quick-make, quick-break action upon expansion and contraction of said enclosure in response to small changes in temperature, a volatile fluid fill disposed within said enclosure, said contacts being at all times directly exposed to said fill, and said fill being of a character which under the operating temperature range of the device prevents the formation on said contacts of films deleteriously affecting the flow of small electric energy between said contacts, and means including a magnetic member operatively connected to at least one of said contacts for imparting snap-action to the movement thereof.

4. A temperature responsive circuit controlling device for low power circuits comprising, in combination, an hermetically sealed expansible and contractible enclosure means, a pair of cooperating contacts within and relatively movable with expansion and contraction of said enclosure means, a volatile fluid fill disposed within said enclosure means, said contacts being at all times directly exposed to said fill, and said fill being of a character which under the operating temperature range of the device prevents the formation on said contacts of films deleteriously affecting the flow of small electric energy between said contacts, said enclosure means including means operatively associated with said contacts for imparting snap action to the movement thereof.

5. A temperature responsive circuit controlling device for low power circuits comprising, in combination, an hermetically sealed expansible and contractible enclosure means, a pair of cooperating contacts within and relatively movable with expansion and contraction of said enclosure means, a volatile fluid fill disposed within said enclosure means, said contacts being at all times directly exposed to said fill, and said fill being of a character which under the operating temperature range of the device prevents the formation on said contacts of films deleteriously affecting the flow of small electric energy between said contacts, said enclosure means including a deformable over-center snap-acting member operatively associated with said contacts for imparting snap action to the movement thereof.

6. A temperature responsive circuit controlling device for low power circuits comprising, in combination, an hermetically sealed expansible and contractible enclosure means, a pair of cooperating contacts within and relatively movable with expansion and contraction of said enclosure, a volatile fluid fill disposed within said enclosure, said contacts being at all times directly exposed to said fill, and said fill being of a character which under the operating temperature range of the device prevents the formation on said contacts of films deteriously affecting the flow of small electric energy between said contacts, said enclosure means including a movable first magnetic member operatively associated with at least one of said contacts, and a stationary second magnetic member cooperable with said first magnetic member to impart snap action to the movement of said contacts.

References Cited in the file of this patent

UNITED STATES PATENTS

| | | |
|---|---|---|
| 243,345 | Lungen | June 21, 1881 |
| 360,823 | Singer | Apr. 5, 1887 |
| 1,265,765 | Ferris | May 14, 1918 |
| 1,464,307 | Bowlus | Aug. 7, 1923 |
| 1,822,408 | King | Sept. 8, 1931 |
| 1,937,746 | Cramblet | Dec. 5, 1933 |
| 2,217,785 | Betz et al. | Oct. 15, 1940 |
| 2,291,567 | Wunsch et al. | July 28, 1942 |
| 2,301,404 | Holmes | Nov. 10, 1942 |
| 2,456,907 | Berberich | Dec. 21, 1948 |
| 2,522,717 | Hottenroth | Sept. 19, 1950 |
| 2,596,704 | Malutich | May 13, 1952 |